United States Patent [19]

Jacoby

[11] 4,123,678
[45] Oct. 31, 1978

[54] LAMINATED STATOR CORE MEMBER SECURED ONLY BY BONDING THE WINDINGS

[75] Inventor: Thomas A. Jacoby, Tecumseh, Mich.

[73] Assignee: Tecumseh Products Company, Tecumseh, Mich.

[21] Appl. No.: 827,622

[22] Filed: Aug. 25, 1977

[51] Int. Cl.² ........................ H02K 1/06; H02K 15/00
[52] U.S. Cl. .................................... 310/217; 310/42; 29/596
[58] Field of Search ................... 29/596, 609; 310/42, 310/179, 217, 254, 258, 259, 261, 273; 336/15, 82, 205, 209, 221, 233, 234, DIG. 4

[56] References Cited

U.S. PATENT DOCUMENTS

| | | | |
|---|---|---|---|
| 3,222,626 | 12/1965 | Feinberg et al. | 310/217 X |
| 3,827,141 | 8/1974 | Hallerback | 310/42 X |
| 3,829,720 | 8/1974 | Swanke et al. | 310/217 X |
| 4,053,800 | 10/1977 | Hanning et al. | 310/42 X |

*Primary Examiner*—Mark O. Budd
*Attorney, Agent, or Firm*—Albert L. Jeffers; Robert G. Irish

[57] ABSTRACT

A stator member for a dynamoelectric machine is assembled by stacking laminations to form a core, squaring the stack of laminations so that one end face is perpendicular to the bore and clamping the stack, placing windings formed of self-bonding magnet wire in the slots in the core, bonding the windings and releasing the clamping, the bonded windings comprising the sole means for holding the laminations in assembled relation.

12 Claims, 7 Drawing Figures

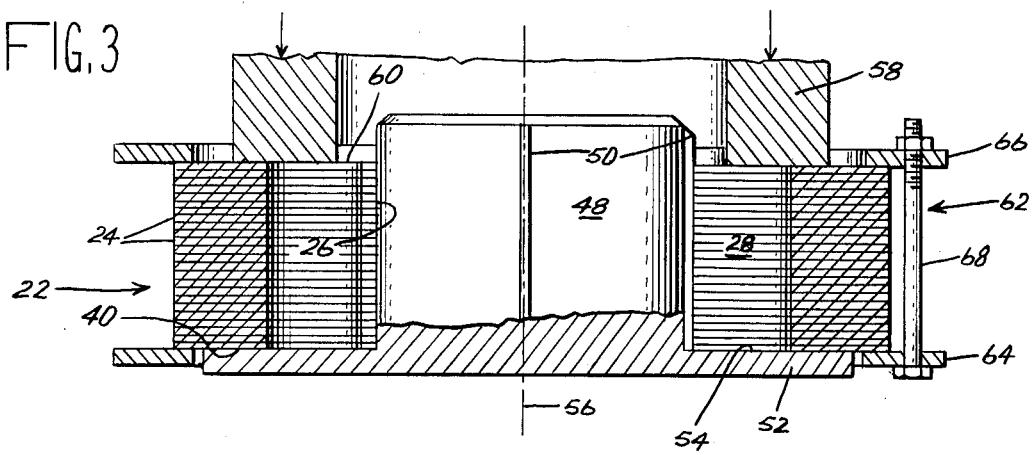
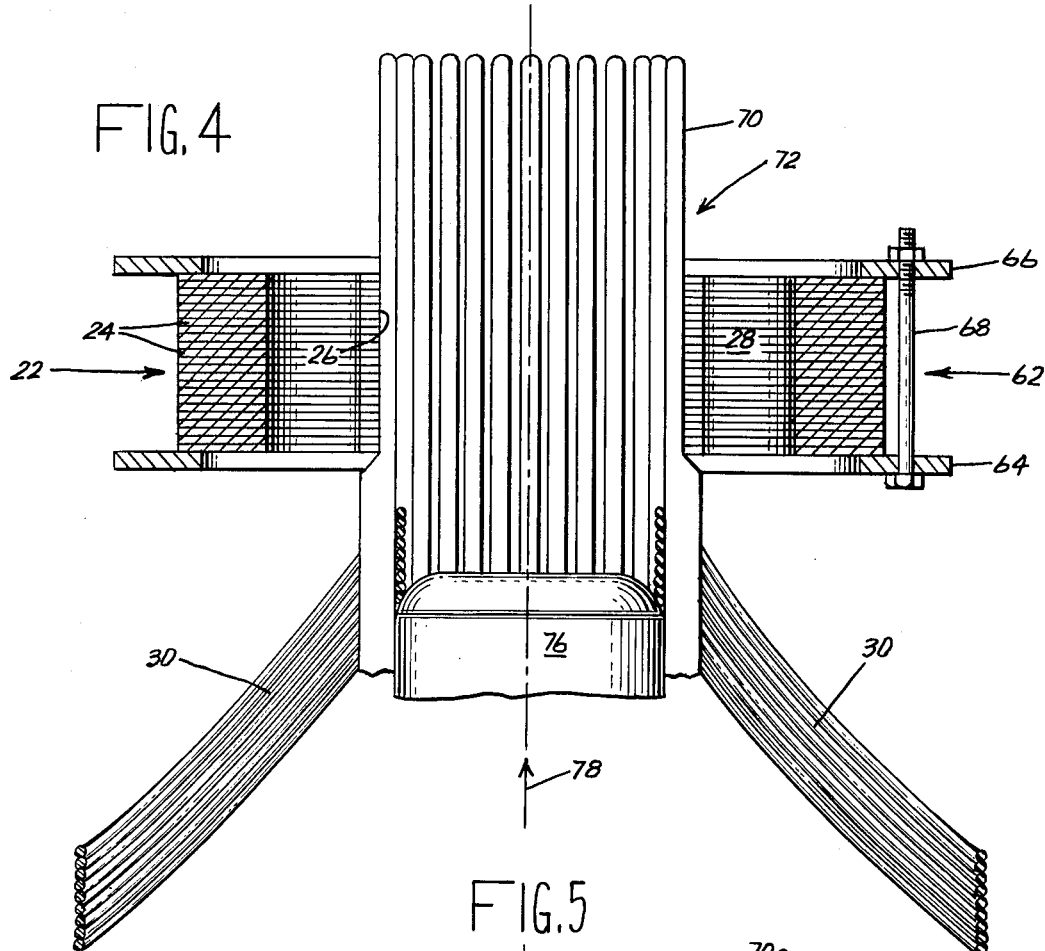
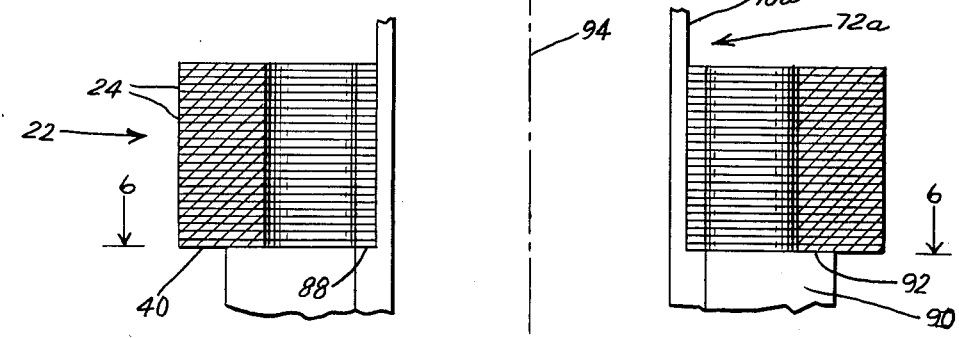

LAMINATED STATOR CORE MEMBER SECURED ONLY BY BONDING THE WINDINGS

BACKGROUND OF THE INVENTION

1. Field of the Invention

This invention relates generally to stator assemblies for dynamoelectric machines and methods of making the same, and more particularly to a stator assembly for a motor used in a hermetic motor-refrigeration compressor assembly, and the method of making the same.

2. Description of the Prior Art

In the past, it has been conventional practice to hold the laminations comprising a dynamoelectric machine stator core member in assembled relation by riveting, cleating or welding prior to placing the field windings in the slots of the core member. In the case of a hermetic motor used in a hermetically sealed motor-refrigeration compressor system, the stator core member is typically bolted to the compressor with an end face of the core member engaging a surface on the compressor, the stator core member thus being supported in cantilever-fashion. It is of course essential that there be close concentricity between the rotor member and the bore of the stator core member and thus, in such hermetic motor applications, it is essential that the end face of the stator core member which abuts the compressor surface be perpendicular to the bore; however, with such prior riveted, cleated or welded stator cores, there has been a tendency for the stator core to sag or tilt after mounting, or during handling prior to mounting, thus adversely affecting the rotor-bore concentricity. To overcome this problem, it is known, as described for example in U.S. Pat. No. 3,490,143, to bond the stack of stator laminations together to form, in essence, an integral structure. However, such stator core member bonding adds appreciably to the cost of the motor. It is also known, as described for example in U.S. Pat. No. 3,493,794, to use the windings themselves to hold the stator core laminations in assembled relation, a sleeve providing the requisite rotor-bore concentricity during attachment of the stator core member to the compressor. While such a structure and method may be satisfactory for shorter stack heights, such as up to about one inch, it is subject to the same sagging or tilting problem in longer stack heights.

U.S. Pat. No. 3,745,138 discloses a so-called self-bonding magnet wire, i.e., a magnet wire having a coating which, following formation of a coil from the wire, permits bonding the entire coil by heating the same.

SUMMARY OF THE INVENTION

In its broader aspects, the invention provides a magnetic device which comprises a core member formed of a stacked assembly of relatively thin laminations of magnetic material, and a winding formed of a plurality of turns of magnet wire embracing a part of the core member, the turns being bonded together and comprising the sole means for holding the laminations in assembled relation.

The method of the invention, in its broader aspects, comprises assembling a stack of relatively thin laminations of magnetic material to form a core member, placing a plurality of turns of magnet wire around a part of the core member to embrace the same, and bonding the turns together so as to form the sole means for holding the laminations in assembled relation.

In accordance with the preferred embodiment of both the apparatus and method of the invention, self-bonding magnet wire of the type described in U.S. Pat. No. 3,745,138 is employed.

It is accordingly an object of the invention to provide an improved magnetic device having a laminated core wherein the laminations comprising the core are held in assembled relation by a bonded winding which embraces a part of the core.

Another object of the invention is to provide an improved dynamoelectric machine stator core member wherein the laminations comprising the core are held in assembled relation by a bonded field winding.

A further object of the invention is to provide an improved method of making a magnetic device having a laminated core wherein winding turns are bonded together to form the sole means for holding the core laminations in assembled relation.

Yet another object of the invention is to provide an improved method of making a dynamoelectric machine stator core member wherein the field windings are formed of self-bonding magnet wire and are bonded together to form the sole support for the stator laminations.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 3 is a cross-sectional view schematically showing one step in the method of the invention;

FIG. 4 is a cross-sectional view schematically showing another step of the method of the invention;

FIG. 5 is a side cross-sectional view schematically showing an alternative step in the method of the invention;

DESCRIPTION OF THE PREFERRED EMBODIMENT

Figure 1:
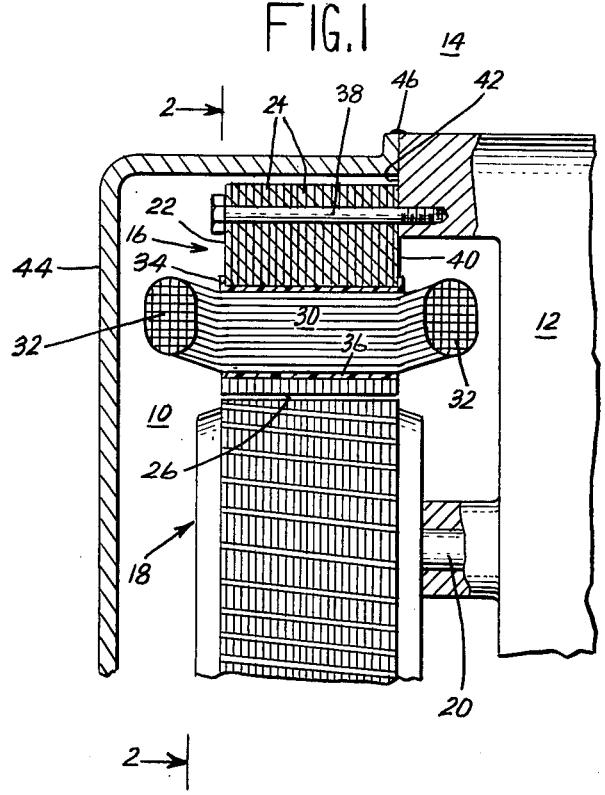
FIG. 1 is a fragmentary, side elevational view, partly in cross section, illustrating the improved dynamoelectric machine stator core member of the invention incorporated in an hermatic motor-refrigeration compressor assembly.
Figure 2:
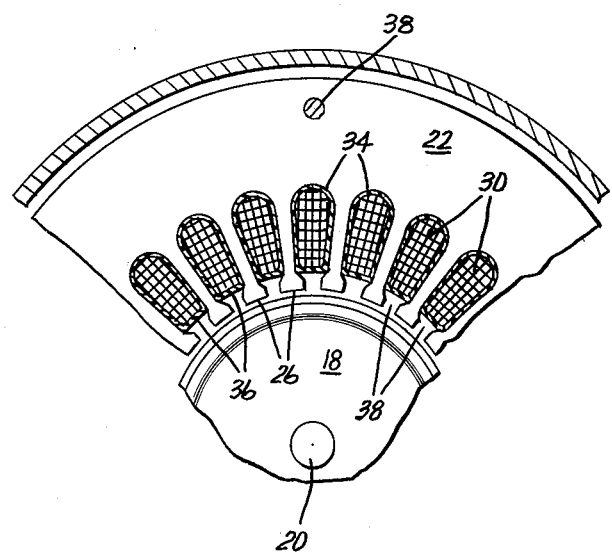
FIG. 2 is a fragmentary cross-sectional view taken generally along the line 2—2 of FIG. 1.

Referring now to FIGS. 1 and 2 of the drawings, there is shown an hermatic motor, generally indicated at 10 driving compressor 12 of a hermatically sealed motor-refrigeration compressor assembly, generally indicated at 14. Motor 10 includes stator assembly 16 and conventional squirrel cage rotor 18 mounted on and driving compressor shaft 20.

Stator assembly 16 comprises stator core member 22 formed of a stacked assembly of relatively thin laminations 24 of magnetic material. Stator core member 22 has bore 26 for receiving rotor member 18 with a plurality of winding slots 28 extending radially outwardly therefrom. Conventional field windings 30 are disposed in slots 28 with end turns 32 extending therefrom. Conventional slot liners 34 are positioned in slots 28 prior to placing windings 30 therein, and conventional wedges 36 are placed in slots 28 over windings 30.

Stator assembly 16 is mounted on compressor 12 by means of through-bolts 38, end face 40 of stator core member 22 engaging surface 42 of compressor 12. Housing 44 is also attached to compressor 12, as by welding at 46, and completes the hermatic enclosure for motor 10.

It will be observed that in order to provide the requisite concentricity of rotor 18 with bore 26 of stator core 22, it is necessary that end face 44 of stator core member 22 be substantially perpendicular to bore 26, i.e., square with respect thereto. In accordance with the invention, this requisite square relationship is maintained by forming windings 30 of self-bonding magnet wire, preferably of the type described in the aforesaid U.S. Pat. No. 3,745,138. Windings 30 are bonded after placing in slots 28, as by heating to a suitable temperature in an oven or by passing electric current therethrough. Prior to mounting stator assembly 16 on compressor 12, the thus-bonded windings 30 provide the sole means of holding laminations 24 of stator core member 22 in assembled relation, and after mounting of stator assembly 16 on compressor 12, the bonded windings 30 prevent sagging or tilting of stator core member 22 thereby preserving the requisite rotor-bore concentricity.

Referring now to FIG. 3 of the drawings, in accordance with the method of the invention, laminations 24 comprising stator core member 22 are placed over arbor member 48, there being a close slip fit between bore 26 and arbor 48. Arbor 48 may have a number of axially extending ribs 50 on its outer periphery which enter the openings of slots 28 thereby to provide proper alignment of the laminations. Arbor 48 extends upwardly from flange 52 having a flat upper surface 54 substantially perpendicular to arbor 48 and its axis 56. End face 40 of the stack of laminations 24 forming stator core member 22 is supported on surface 54 of flange 52 thus providing the requisite perpendicular relationship between end face 40 and bore 26. The stack of laminations 24 on arbor 48 may be compressed, if desired, as by ram 58 engaging end face 60 opposite end face 40. The stack of laminations 24 while squared on arbor 48 are clamped by clamping assembly 62 comprising clamping rings 64, 66, respectively engaging end faces 40, 60 and secured together by suitable bolts 68. It will be readily understood that a suitable expanding arbor may be employed rather than the solid arbor 48 shown in FIG. 3.

Figure 6:
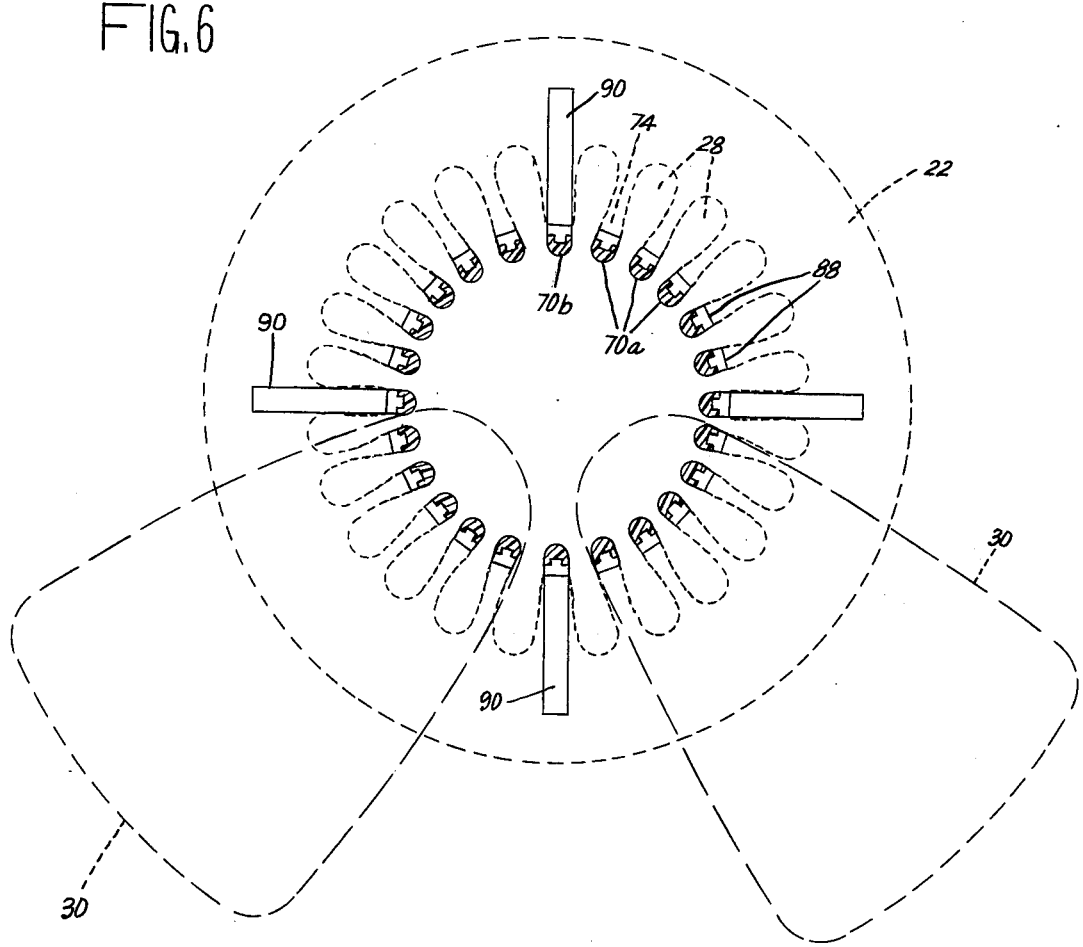
FIG. 6 is a cross-sectional view taken generally along the line 6—6 of FIG. 5.

Referring now to FIG. 4, windings 30 are placed on blades 70 of conventional coil injection apparatus 72, such as that described and illustrated in U.S. Pat. No. 3,507,029, following which the stack of laminations 24 comprising stator core member 22, maintained in squared relationship by clamping assembly 62, is placed over blades 70 with blades 70 engaging the ends of teeth 74 defined between slots 28 (FIG. 6). Coils 30 are then injected into slots 28 by movement of stripper 76 in the direction shown by arrow 78, as further described in the aforesaid U.S. Pat. No. 3,507,029. As well known to those skilled in the art, slot wedges 36 may be inserted simultaneously with windings 30 by coil injection apparatus 72. End turns 32 may then be formed or blocked away from bore 26 in conventional fashion.

Figure 7:
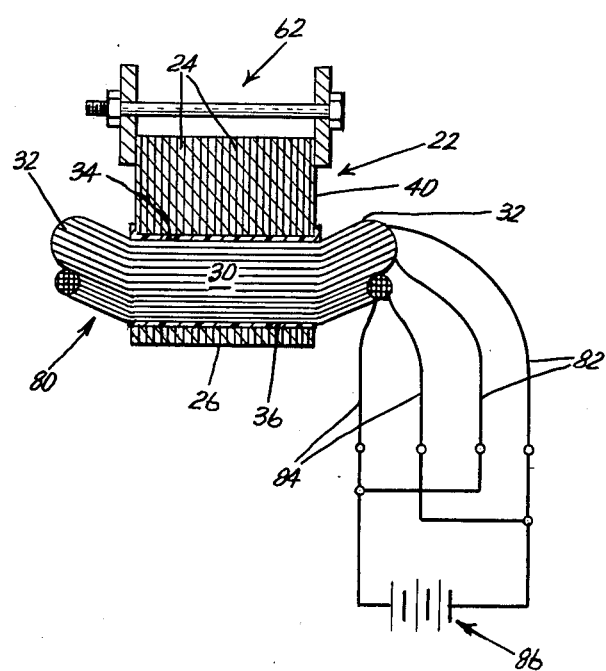
FIG. 7 is a cross-sectional view schematically showing yet another step in the method of the invention.

Referring now to FIG. 7, in which auxiliary or starting windings 80 are shown in slots 28 in addition to main or running windings 30, stator core member 22 with windings 30, 80 placed therein and with clamping assembly 62 still thereon, is removed from coil injection apparatus 72 and windings 30, 80 heated to a temperature sufficient to cause thermosetting of the self-bonding coating thereon, as by connecting leads 82, 84 to a source of voltage, shown schematically at 86. End turns 32 may be formed or blocked and/or tied prior to heating, or at the time of heating; the invention may eliminate the need for tying the end turns. Clamping assembly 62 and voltage source 86 are then removed leaving stator core member 22 held in assembled relationship, and with the requisite square relationship of the end face 40 with bore 26 maintained, solely by the thus-bonded windings 30, 80. Stator core assembly 16 is then assembled on compressor 12, as shown in FIG. 1.

Referring now to FIGS. 5 and 6 in which like elements are indicated by like reference numerals, the squaring step described above in connection with FIG. 3 may be eliminated by employing coil injection apparatus 72a in which certain blades 70a have shoulders 88 formed thereon, and other blades 70b have projections 90 having upper surfaces 92 thereon, shoulders 88 and upper surfaces 92 being co-planar and perpendicular to axis 94 of coil injection apparatus 72a thereby supporting end face 40 of the stack of laminations 24 forming stator core member 22 and providing the requisite squared relationship between end face 40 and bore 26. Although not shown in FIG. 5, it will be understood that clamping assembly 62 shown in FIGS. 3 and 4 would likewise be used in the alternative method of FIGS. 5 and 6.

It will now be seen that the invention eliminates the rivets, cleats, welds, and/or bonded stator assemblies previously employed while insuring the requisite squared relationship of one end face with respect to the bore of the stator core member.

While there have been described above the principles of this invention in connection with specific apparatus, it is to be clearly understood that this description is made only by way of example and not as a limitation to the scope of the invention.

What is claimed is:

1. In a magnetic device comprising a core member formed of a stacked assembly of relatively thin laminations of magnetic material, and a winding formed of a plurality of turns of magnet wire embracing a part of said core member, the improvement wherein said turns are bonded together and comprise the sole means for holding said laminations in assembled relation.

2. The apparatus of claim 1 wherein said magnet wire is of the self-bonding type.

3. The apparatus of claim 2 wherein said device is a dynamoelectric machine and said core member has at least two winding slots therein, said winding comprising a coil having sides respectively disposed in said slots.

4. The apparatus of claim 3 wherein said core member is a stator member having opposite end faces and a bore for rotatably receiving a rotor member, at least one of said end faces being maintained substantially perpendicular to said bore by said bonded turns.

5. In a method of making a magnetic device comprising the steps of assembling a stack of relatively thin laminations of magnetic material to form a core member, and placing a plurality of turns of magnet wire around a part of said core member to embrace the same, the improvement comprising the further step of bonding said turns together to form the sole means for holding said laminations in assembled relation.

6. The method of claim 5 wherein said magnet wire is of the self-bonding type, said bonding step comprising heating said turns to bond the same.

7. The method of claim 6 wherein said turns are heated by passing current therethrough.

8. The method of claim 6 wherein said device is a dynamoelectric machine and said core member is a stator member having opposite end faces, a bore for rotatably receiving a rotor member, and at least two winding slots communicating with said bore, said turns being placed in said slots, comprising the further step of squaring said bore with respect to at least one of said end faces prior to placing said turns in said slots.

9. The method of claim 8 wherein said squaring step comprises placing the bore of said stack of laminations on an arbor member and supporting said one end face on a surface perpendicular to the axis thereof, and clamping said stack of laminations, comprising the further step of releasing said clamping following said bonding step.

10. The method of claim 8 wherein said squaring step comprises placing the bore of said stack of laminations on the blade members of coil insertion apparatus and supporting said one end face on a surface thereof perpendicular to said blade members, and clamping said stack of laminations, comprising the further step of releasing said clamping following said bonding step.

11. The method of claim 8 wherein said squaring step includes clamping said stack of laminations, and comprising the further steps of forming the end turns away from said bore prior to said bonding step, and releasing said clamping following said bonding step.

12. The method of claim 11 wherein said squaring step includes applying pressure on the other of said end faces prior to said clamping step.

* * * * *